June 25, 1935.  C. S. SMITH  2,006,118
COVER FOR CHICKENS
Filed June 25, 1934  2 Sheets-Sheet 1
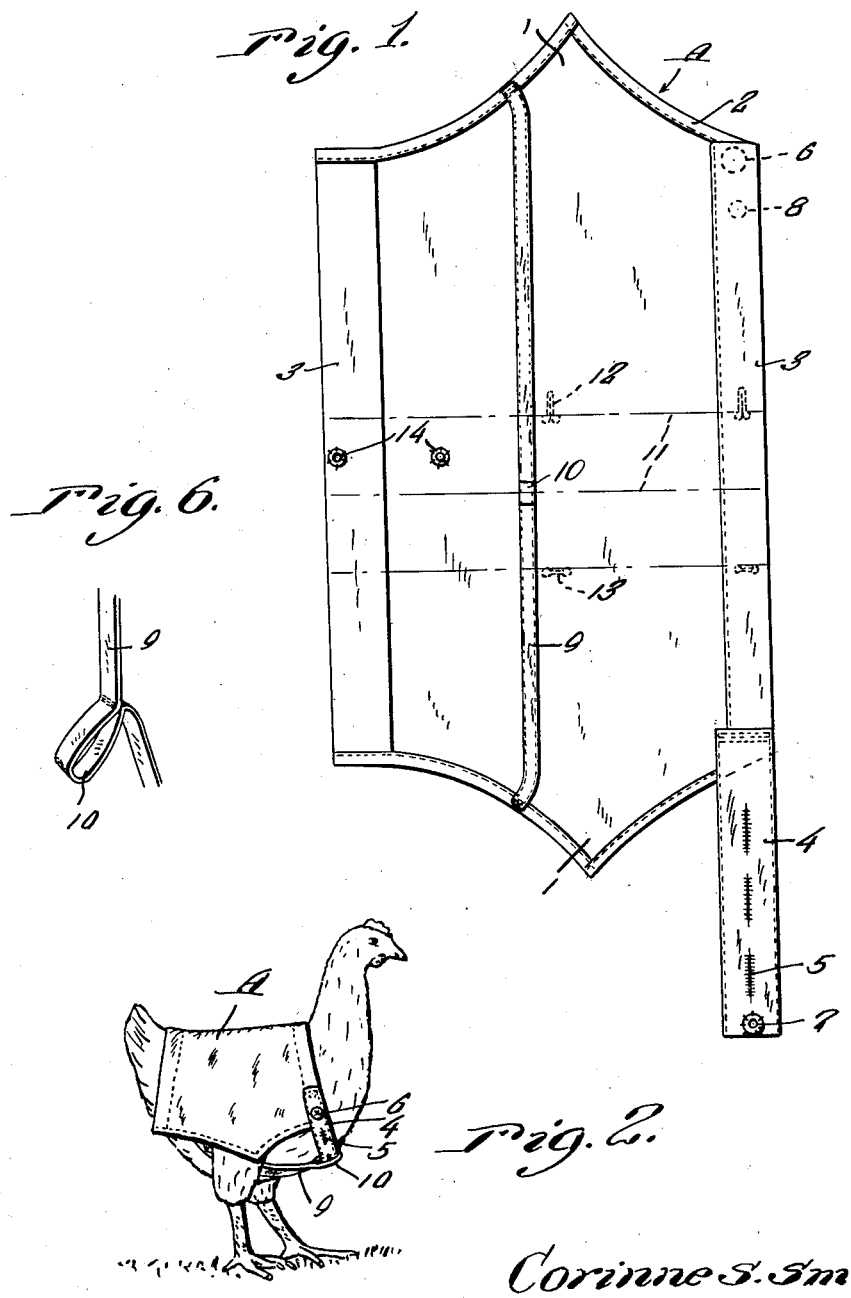
Inventor
Corinne S. Smith
By Clarence A. O'Brien
Attorney June 25, 1935.   C. S. SMITH   2,006,118
COVER FOR CHICKENS
Filed June 25, 1934   2 Sheets-Sheet 2
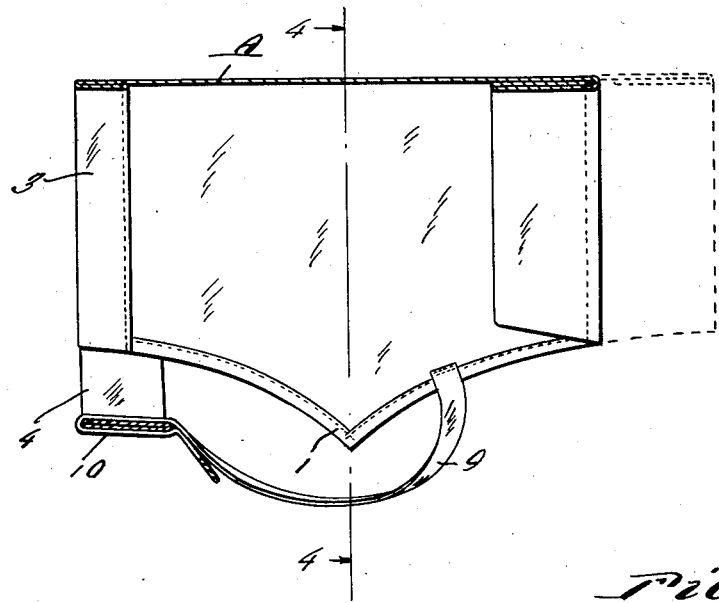
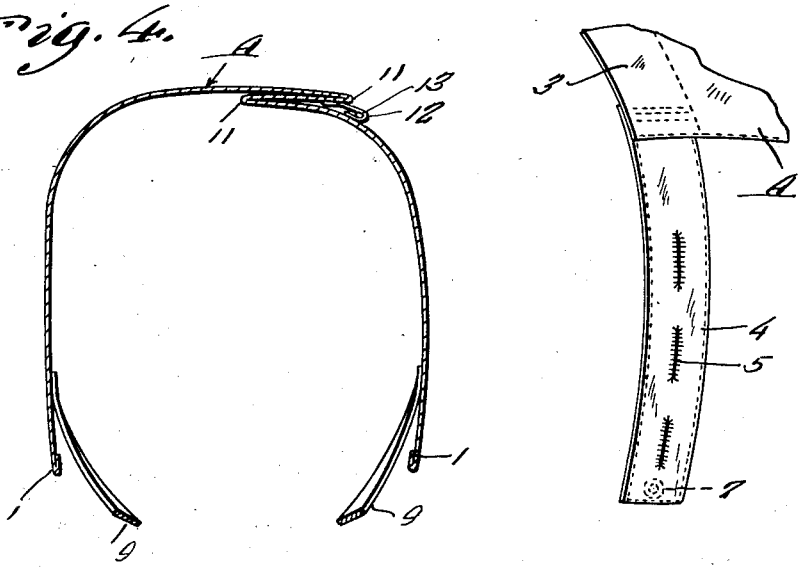
Inventor
Corinne S. Smith
By Clarence A. O'Brien
Attorney Patented June 25, 1935

2,006,118

UNITED STATES PATENT OFFICE 2,006,118

COVER FOR CHICKENS

Corinne Sterrett Smith, Walkerton, Ind.

Application June 25, 1934, Serial No. 732,309

2 Claims. (Cl. 119—143)

This invention relates to a cover for chickens and other poultry, the general object of the invention being to provide a cover or jacket for poultry which have lost their feathers, to prevent sunburn and other poultry from picking the one wearing the jacket.

Another object of the invention is to make the device adjustable for different sizes of poultry.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a bottom and plan view of the device in open position.

Figure 2 is a view showing the device in use on a chicken.

Figure 3 is a longitudinal sectional view through the device with the device in the position it occupies when placed on a chick with the rear end of the device folded inwardly to shorten the device.

Figure 4 is a section on the line 4—4 of Figure 3.

Figure 5 is a fragmentary view showing the buttonhole carrying band.

Figure 6 is a fragmentary view showing the loop of the central strap.

In these drawings the device is shown at A and is formed of any suitable fabric and is of elongated form with its ends pointed as shown at 1 and these ends are folded and sewn as shown at 2 and the sides are folded and sewn as shown at 3. One end of a strap 4 is sewn to one end of the part 3 and said strap is formed with a longitudinal extended row of buttonholes 5 any one of which is adapted to receive a button 6 on the other end of the part 3 and the free end of the strap 4 carries a part 7 of a snap fastener the other part of which is shown at 8 and is located adjacent the button 6. A narrow strap 9 has its ends connected with the ends of the device rearwardly of the points and the central portion of this strap 9 is formed with a loop 10 through which is adapted to be passed the strap 4. As shown in Figure 2 a jacket is placed on a chicken with the strap 9 passing under the legs with the loop 10 having the strap 4 passing therethrough so that when the strap is attached to the other end of the jacket by the button 6, the device will be firmly held on the chicken covering the back and side portions thereof.

I make the device adjustable to different sizes of chickens by folding in on the lines 11 and connecting the folded parts together by the hooks 12 and eyes 13. The rear part can also be folded longitudinally, as shown in Figure 3, and the two parts connected together by snap fastener parts 14.

Thus I have provided an adjustable jacket for poultry which have lost their feathers so as to prevent sunburn and other poultry from picking them.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A jacket for poultry comprising an elongated member of fabric having a button at one end of the front part, a strap connected to the opposite end of the front part having a number of buttonholes therein to receive the button, a strap having its ends connected to the end parts of the member slightly in rear of the longitudinal center of the member and said strap having a loop at its center through which the first strap passes, the second strap having the portions adjacent its ends passing under the legs, with the parts on each side of the loop converging forwardly to the loop.

2. A jacket for poultry comprising an elongated sheet of fabric for fitting over the back and sides of a fowl, a button connected at one end of the front part, a strap connected to the opposite end of said front part and having a longitudinally extending row of buttonholes, snap fasteners connecting the strap to the opposite end of the front part, a strap having its ends connected to the end parts of the jacket and said second strap having a centrally arranged loop therein to receive the first-mentioned strap, said second strap converging forwardly to the loop, when the loop is placed in engagement with the first strap with the end portions of the second strap passing under the legs, the jacket having its rear portion adapted to be folded longitudinally to shorten the jacket, fastening means for holding the folded portion in folded condition and fastening means on the jacket spaced apart for holding portions of the jacket in folded position, the lines of fold running from front to rear at the top part of the jacket.

CORINNE STERRETT SMITH.